(12) United States Patent
Engler

(10) Patent No.: US 8,494,990 B1
(45) Date of Patent: Jul. 23, 2013

(54) RANDOM EMIGRANT STRATEGY FOR EXPLICIT DIPLOID EVOLUTIONARY CONTROL

(75) Inventor: Joseph J. Engler, Coggon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 318 days.

(21) Appl. No.: 13/051,849

(22) Filed: Mar. 18, 2011

(51) Int. Cl.
*G06N 5/00* (2006.01)

(52) U.S. Cl.
USPC .............................................. 706/13; 706/45

(58) Field of Classification Search
USPC ...................................................... 706/13, 45
See application file for complete search history.

(56) References Cited

PUBLICATIONS

Schnier, et al., Dominant and Recessive Genes in Evolutionary Systems Applied to Spatial Reasoning, Key Centre of Design Computing, Department of Architectural and Design Science, University of Sydney, 1997, pp. 1-10.*

Bookstaber, A Recessive/Dominant Genetic Algorithm, 2003, pp. 1-11.*

* cited by examiner

*Primary Examiner* — Wilbert L Starks
(74) *Attorney, Agent, or Firm* — Donna P. Suchy; Daniel M. Barbieri

(57) ABSTRACT

A method of analyzing an environment is provided. The method comprises generating, using a population generation module, an initial population comprising a plurality of individuals, each individual comprising a dominant genotype and a recessive genotype. The method further comprises evaluating, using a fitness evaluation module, the fitness of each of the plurality of individuals by applying a fitness function to the dominant genotype of each individual. The method further comprises modifying, using the fitness evaluation module, the initial population of individuals based on the fitness evaluation. The method further comprises injecting, using the population generation module, one or more additional individuals into the modified population of individuals. Each of the additional individuals comprises a randomly generated dominant genotype. The population generation module, fitness evaluation module, and change detection module comprise instructions stored on a non-transitory computer-readable medium that are executable by a processor.

20 Claims, 3 Drawing Sheets

RANDOM EMIGRANT STRATEGY FOR EXPLICIT DIPLOID EVOLUTIONARY CONTROL

CROSS-REFERENCE TO RELATED APPLICATIONS

The present disclosure is related to U.S. patent application Ser. No. 13/051,835, titled "Explicit Diploid Evolutionary Control", U.S. patent application Ser. No. 13/051,672, titled "Prediction Method", U.S. patent application Ser. No. 13/051,751, titled "Diploid Control of Water Heaters", U.S. patent application Ser. No. 13/051,717, titled "Agent-Based Chaotic Control of Wind Turbines", and U.S. patent application Ser. No. 13/051,787, titled "Wind Prediction for Wind Farms Through the Use of Weather Radar", all of which were filed concurrently with the present application and all of which are incorporated herein by reference.

BACKGROUND

The present disclosure relates generally to the field of process control systems.

Optimization and modeling algorithms are used to optimize and model various environments. Some systems utilize biologically inspired algorithms (e.g., genetic algorithms, particle swarm intelligence, evolutionary strategies, etc.) to perform optimization and modeling due to their ability to properly learn and optimize variant environments rapidly. Genetic algorithms may be relatively slow and ineffective at handling environments which change during optimization. Such genetic algorithms may need to be restarted to effectively handle the changes upon detection of an environmental change, which may result in poor performance of the algorithm. Biologically inspired algorithms also are not equipped to maintain memory of previously encountered environments and must be restarted from scratch upon significant environmental change detection. This may result in poor performance and/or abandonment of the methodology for optimization and modeling.

SUMMARY

One embodiment of the disclosure relates to a method of analyzing an environment. The method comprises generating, using a population generation module, an initial population comprising a plurality of individuals, each individual comprising a dominant genotype and a recessive genotype. The method further comprises evaluating, using a fitness evaluation module, the fitness of each of the plurality of individuals by applying a fitness function to the dominant genotype of each individual. The method further comprises modifying, using the fitness evaluation module, the initial population of individuals based on the fitness evaluation. The method further comprises injecting, using the population generation module, one or more additional individuals into the modified population of individuals. Each of the additional individuals comprises a randomly generated dominant genotype. The population generation module, fitness evaluation module, and change detection module comprise instructions stored on a non-transitory computer-readable medium that are executable by a processor.

Another embodiment of the disclosure relates to a control system. The control system comprises an electronic processor configured to generate a population comprising a plurality of individuals, each individual comprising a dominant genotype and a recessive genotype. The processor is further configured to evaluate the fitness of the plurality of individuals. Evaluating the fitness of the plurality of individuals comprises applying a fitness function to the dominant genotype of each individual. The processor is further configured to modify the dominant genotype of one or more selected individuals based on the fitness function and generate a modified population based on the modified selected individuals. The processor is further configured to generate one or more additional individuals for insertion into the modified population, each of the additional individuals comprising a randomly generated dominant genotype.

Another embodiment of the disclosure relates to a non-transitory computer-readable medium having instructions stored thereon. The instructions are executable by a processor to execute a method comprising generating a population comprising a plurality of individuals, each individual comprising a dominant genotype and a recessive genotype. The fitness of population of individuals for a modeled environment is evaluated and the population is modified based on results of the fitness evaluation. The method further comprises generating at least one additional individual and injecting the individual into the population after the population has been modified. The at least one additional individual is initially assigned a randomly generated dominant genotype.

DETAILED DESCRIPTION

Figure 1A:
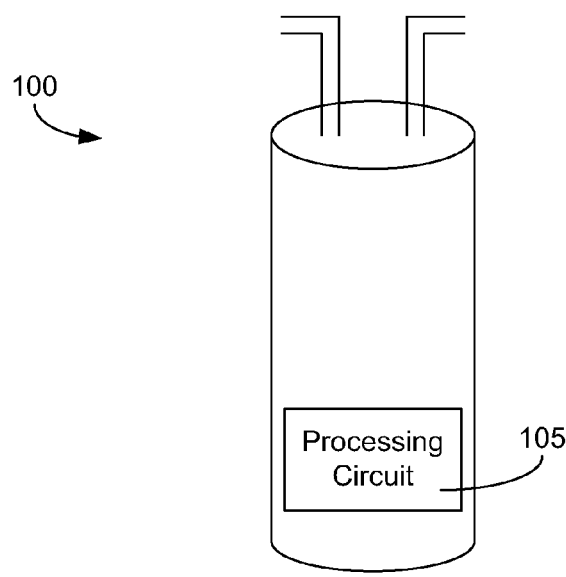
FIG. 1A is an illustration of a water heater according to an exemplary embodiment.

Referring generally to the figures, systems, methods and algorithms for controlling a process using diploid evolutionary control are shown according to various exemplary embodiments. Genetic algorithms may be used to analyze a system operating environment and determine solutions that are most fit to allow the system to achieve certain goals. Genetic algorithms may evaluate a group of individuals in a population against a fitness function to determine which individuals are most fit to achieve the goals. Each of the individuals includes at least one genotype that represents a solution for controlling the system.

For example, in some embodiments, a genetic algorithm may be used to analyze solutions for controlling a water heater. The environment being analyzed may include any factors that may affect the operation of the water heater, such as the temperature of the water in the tank, the cost of the energy (e.g., electrical energy) used to heat the water, the time of day and/or day of week, the demand for water from the water heater, and/or other factors. A population of individuals may be generated such that each individual represents one or more solutions for controlling the water heater over a particular timeframe. For example, each individual may include a genotype (e.g., a data structure, such as a bit string container) configured to store a solution for controlling the water heater (e.g., a bit string or other value that defines how a controller of the water heater controls the heating elements of the water heater over a particular period of time). For example, a first bit string stored in a genotype of one individual may cause the controller to activate the heating element and heat the water frequently during daytime hours and less frequently in the evening. A second bit string stored in a genotype of another individual may cause the controller to activate the heating element infrequently during daytime hours and more frequently in the evening. The population of individuals may represent and/or contain all solutions that are to be examined in light of the fitness function.

The fitness function may be designed and/or customized for particular applications and/or to meet particular goals. For example, the fitness function may be configured to favor solutions that heat the water during a time when the water is most likely to be used. The system may be configured to collect flow demand data for different days and/or times to determine when the water heater is typically in use and not in use. If the flow demand data indicates that the water heater is used mainly in the evening, such a fitness function may determine the individual having the second bit string stored in its genotype (i.e., the bit string that causes the heating element to be activated more frequently in the evening) to be more fit than the individual having the first bit string stored in its genotype. In another example, the fitness function may be configured to favor solutions that heat the water during a time when energy costs are lowest. If energy costs are lower during daytime hours than in the evening, such a fitness function may determine the individual having the first bit string stored in its genotype (i.e., the bit string that causes the heating element to be activated more frequently in the daytime) to be more fit than the individual having the second bit string stored in its genotype.

In other embodiments, a genetic algorithm may be used to analyze solutions for controlling wind turbine or group of wind turbines (e.g., a wind farm). The environment of the wind turbines may include any factors that affect the operation of the wind turbines, such as current and/or historical data regarding speed of the wind in the area of the wind turbines, the structural load applied to the wind turbines to generate electrical power, the power output of the wind turbines, and/or other factors. The solutions stored in the genotypes of the individuals may include one or more values (e.g., integers, real numbers, bit strings, etc.) representing set points used by controllers of the wind turbines to configure the structural load to be applied to the wind turbine and the anticipated power output of the wind turbine over a particular period of time. The system may be configured to receive data regarding historical power demand for the wind turbines, and the fitness function may be configured to determine solutions to be most fit that cause the turbines to generate more power during times of high anticipated demand and less power during times of lower anticipated demand.

In some embodiments, a haploid genetic algorithm may be used to control a system. Haploid genetic algorithms, or genetic algorithms using a single genotype to represent each individual in the population of the algorithm, may react ineffectively to changes in environmental conditions.

Various exemplary embodiments disclosed herein utilize a diploid, vice haploid representation for individuals within the population of the algorithm where each individual is represented using a dominant genotype and a recessive genotype. Such embodiments may add explicit memory to biologically inspired algorithms with real-time change detection to speed optimization and modeling convergence. Diploid individuals are configured to store two separate solutions for the system, one in a dominant genotype and one in a recessive genotype. The solutions stored in the dominant genotypes may represent a main group of solutions to be evaluated for fitness in addressing the goals represented within the fitness function. The recessive genotype of each individual is used to maintain a memory or history of previous best individuals based on fitness evaluations for rapid environmental change detection and adjustment. For example each individual in the population may include a dominant genotype configured to store a first bit string that may be used to control a water heater in a first manner and a recessive genotype configured to store a second bit string that may be used to control a water heater in a second manner. The second bit string may be a bit string that was previously evaluated using the fitness function and determined to be an appropriate, or fit, solution for a set of previously encountered environmental conditions (e.g., water temperature, flow demand, time and/or day, etc.). A fitness function may be used to evaluate the fitness of individuals in the population for selection of parents for recombination and mutation and to arrive rapidly at a new optimization schema. Exemplary embodiments disclosed herein may provide memory of good solutions for previously encountered process environments, rapid convergence of control algorithms to changes in environments, and/or maintenance of diversity within the population of the algorithms.

Figure 1B:
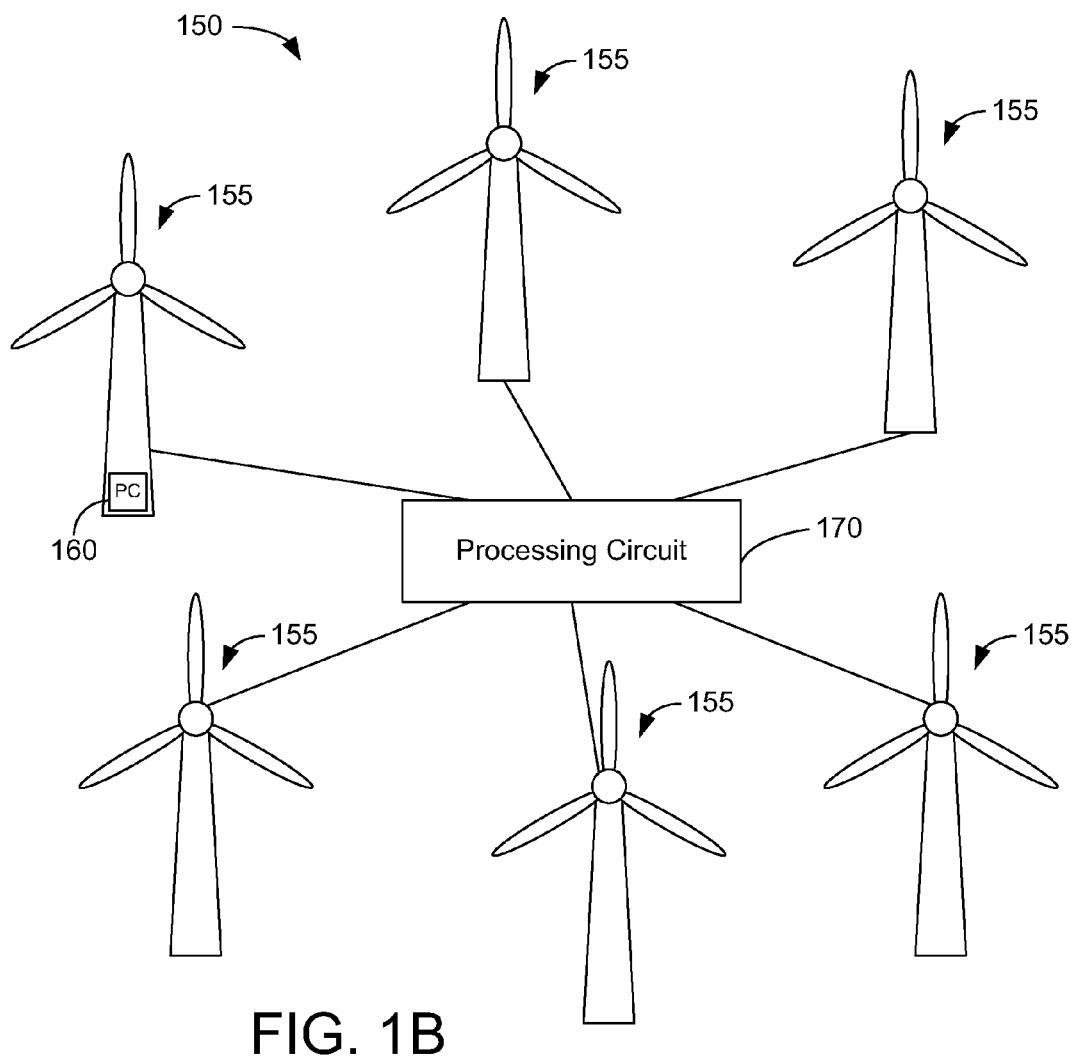
FIG. 1B is an illustration of a wind farm including a plurality of wind turbines according to an exemplary embodiment.

Referring now to FIGS. 1A and 1B, systems that may be controlled using methods disclosed herein are illustrated according to exemplary embodiments. Although embodiments are described below with respect to home electrical water heaters and wind turbines, the present disclosure is applicable to a variety of systems, including industrial processes, heating and/or cooling processes, power generation processes, household appliance control, smart meters for household and industrial applications, control of complex systems such as a smart grid, etc. For example, in some embodiments, the electrical water heater 100 illustrated in FIG. 1A may instead be a natural gas water heater or a furnace for use in home or industrial applications.

FIG. 1A illustrates a home electrical water heater 100. Water heater 100 is configured to heat water by converting electrical energy into thermal energy and transferring heat to water (e.g., within a tank) using a heating element. The temperature of the water stored in the water heater may be monitored using a temperature sensor (e.g., thermocouple, thermistor, RTD, etc.). Water heater 100 may be controlled by providing a signal or signature (e.g., a string of bits) that cycles the heating element on and off to achieve a water temperature within a desired range. In some embodiments, water heater 100 may be controlled using a hysteresis loop that activates heating at a low water temperature set point and stops heating at a high water temperature set point.

Water heater 100 may be controlled using a diploid evolutionary control method carried out by a processing circuit 105 associated with (e.g., electrically coupled to) water heater 100. For example, processing circuit 105 may be configured to monitor and store environmental data relating to the water heater (e.g., water flow demand data, energy cost data, etc.) over a period of time. The data may be time stamped such that the data is associated with a particular time, date, day of the week, time of year (e.g., month or season), etc. The data may be used to generate a fitness function that evaluates the fitness of possible control solutions (e.g., values that represent a control signal used to control water heater 100 over a period of time) to determine an appropriate solution under current environmental conditions (e.g., time and/or date, current flow demand, current energy price, etc.) for controlling water heater 100. Good solutions encountered over time for different water heater environmental conditions may be stored and utilized in the event of recurrence of similar environmental conditions.

For example, collected data may show that the water heater is used very little during the hours of 10 AM and 7 PM on weekdays. In such an example, the fitness function may determine a solution that keeps the heating element off for most of this time period on weekdays to be more fit for controlling the water heater during this time than a solution that turns the heating element on frequently within this time range. In another example, collected data (e.g., from a smart grid) may indicate that energy is very expensive during evening hours on weekdays and less expensive during daytime hours. In such an example, the fitness function may determine a solution that heats the water more during low-cost daytime hours and avoids turning the heating element on frequently during expensive evening hours on weekdays, which may be more fit than a solution that heats the water frequently during the expensive evening hours.

In yet another example, the water heater may be used very little during daytime hours on weekdays and frequently in the evening hours, and energy may cost more during the evening hours. In such an example, the fitness function may be designed to balance between the cost of heating the water and the demand for the water in the evening. In some embodiments, the fitness function may be designed to activate the heating element frequently during the inexpensive later daytime hours and then activate the heating element sparingly during the evening hours to maintain the temperature while controlling cost. In other embodiments, the fitness function may be designed to activate the heating element frequently in the evening when demand is high with only slight regard to the increased cost of energy during that time. In some embodiments, the balance between flow demand and cost may be based in part on input from a user of the water heater.

Once a control solution has been determined, a control signal (e.g., a bit string) associated with the selected solution may be used (e.g., by processing circuit 105 and/or a different heating element control circuit) to cycle power to the heating element over a particular period of time (e.g., 1 minute, 15 minutes, 1 hour, 4 hours, 1 day, etc.). For example, a bit string may be generated indicating when the heating element should be cycled on and off. In one example, a bit string of "0011001110" may be used to control the water heater over a time period of ten minutes. The bit string may indicate that the heating element should be turned off for the first two minutes, turned on for the third and fourth minutes, turned off again for the fifth and sixth minutes, turned on again for the seventh, eighth, and ninth minutes, and turned off again for the tenth minute. Use of diploid evolutionary control was demonstrated to result in a reduction of electrical power usage of up to 68 percent in a home electrical water heater, and mathematical modeling indicates a possible reduction of up to 72 percent.

FIG. 1B illustrates a wind farm 150 including a plurality of wind turbines 155. In some embodiments, each wind turbine 155 may have a dedicated processing circuit 160 configured to control the wind turbine 155 using a diploid evolutionary method. Processing circuit 160 may be configured to utilize one or more adjustable set points to determine the structural load that should be applied in wind turbine 155 to generate electrical energy. The set points may be used in conjunction with a power prediction schema that predicts the power to be generated by wind turbine 155 over a particular time period (e.g., a 24 hour period). In some embodiments, if wind is available during a time in which wind turbine 155 was not predicted to run, processing circuit 160 may disable wind turbine 155 from operating to ensure power grid stability.

Possible solutions for controlling wind turbine 155 (e.g., representing a set of set points for configuring the wind turbine structural load and/or power output) may be evaluated using a fitness function based on environmental conditions (e.g., wind speed, structural load state, power output state, etc.). The fitness function may be designed to balance between the electrical power generated by wind turbine 155 and the structural load applied to wind turbine 155. For example, data collected by processing circuit 160 may indicate a lower power demand during a certain period of time and the fitness function may find a solution that applies a lower structural load and generates less power during this time to be more fit than a solution that applies a larger structural load and generates more power during this time. Once a solution has been selected, wind turbine 155 may be controlled (e.g., by processing circuit 160 and/or another wind turbine controller) using set points that correspond with the selected solution.

In other embodiments, two or more wind turbines 155 may be controlled by a central processing circuit 170 configured to control multiple wind turbines 155 using a diploid evolutionary method. In such embodiments, central processing circuit 170 may be configured to account for the impact individual turbines may have on other turbines in the wind farm. For example, one turbine may generate a wake that affects the operation of other neighboring turbines in the wind farm. Central processing circuit 170 may be configured to operate the wind turbines in the wind farm in a manner that reduces the effect that the wakes from the turbines have on other neighboring turbines to reduce the structural loads on the neighboring turbines. In other embodiments, each individual wind turbine 155 may be controlled by a dedicated processing circuit and multiple wind turbines (e.g., a wind farm or portion of a wind farm) may also be controlled by a central processing circuit.

Figure 2:
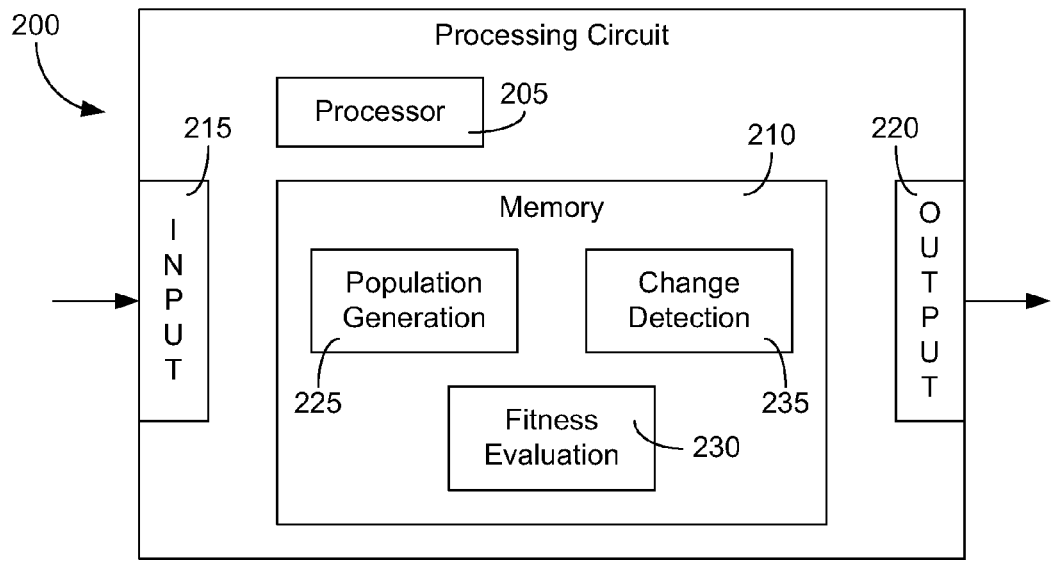
FIG. 2 is a block diagram of a processing circuit configured to control a process using diploid control according to an exemplary embodiment.

Referring now to FIG. 2, a block diagram of a processing circuit 200 (e.g., an electronic processor) configured to control a process using a diploid evolutionary method is shown according to an exemplary embodiment. Processing circuit 200 includes at least one processor 205, which may be any general purpose or special purpose processor (e.g., FPGA, CPLD, ASIC, etc.). In some embodiments, processor 205 may be chosen based on the type of application with which processing circuit 200 is being utilized. Processing circuit 200 also includes a memory 210 that may be any type of computer or machine-readable media (e.g., hard drive, flash memory, ROM, RAM, EEPROM, CD, DVD, etc.). Processing circuit 200 may also include an input interface 215 for receiving input data relating to the system or process being controlled and an output interface 220 for outputting signals used to control the system or process.

Memory 210 may be configured to store one or more modules having instructions that are executable by processor 205. For example, memory 210 may include a population generation module 225 configured to generate a population of individuals for use in modeling an environment. The fitness of each individual within the context of the environment may be evaluated by a fitness evaluation module 230, and the population may be modified or adjusted based on the fitness evaluation. Memory 210 may also include a change detection module 235 configured to detect a change in the environment of the system or process being controlled by processing circuit 200. Change detection module 235 may be configured to modify the population based on the detected environmental change.

Figure 3:
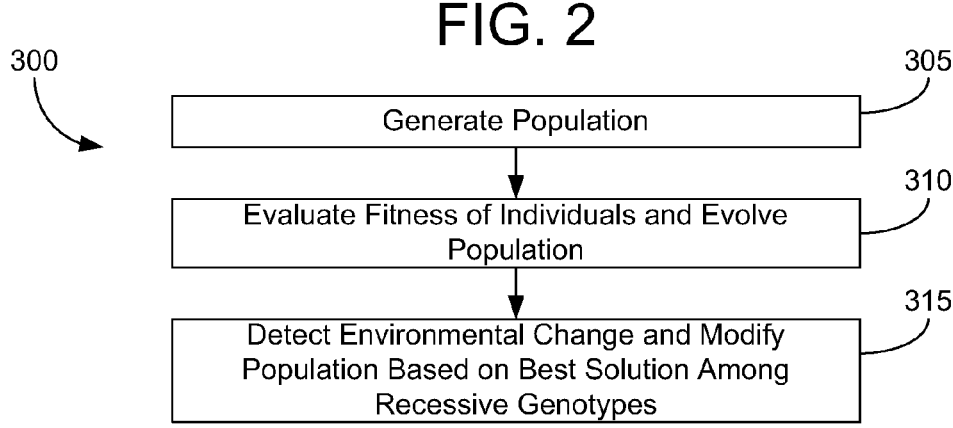
FIG. 3 is a flow diagram of a method of controlling a process using a diploid evolutionary algorithm according to an exemplary embodiment.

Referring now to FIG. 3, a flow diagram of a method 300 for controlling a system or process using diploid evolutionary control is shown according to an exemplary embodiment. In some embodiments, method 300 may be implemented using a diploid evolutionary algorithm executed by a processing circuit (e.g., processing circuit 200).

At step 305, a population of individuals is generated (e.g., by population generation module 225) to model the environment being controlled. Evolutionary computation algorithms have been represented using a haploid representation in which each individual is represented by a single genotype. In the case of a genetic algorithm with binary bit string definitions, a haploid representation of each organism may be defined as follows:

$ind_i=\{x_1, x_2, \ldots, x_n\}$ with $n \in R^2$ and $x \in \{0,1\}$

In this definition, $ind_i$ is the $i^{th}$ individual or organism in the population of the genetic algorithm. At each iteration of the genetic algorithm, the haploid genotype is evaluated against an optimization function and then subjected probabilistically to evolution via mutation and crossover. During the run of the evolutionary algorithm, the haploid representation may constantly be searching for the global optima of the search space.

In method 300, each individual in the population is represented using a diploid representation such that each individual has associated therewith both a dominant genotype and a recessive genotype. In one embodiment, the population may include solutions (e.g., bit strings) for controlling the operation of a heating element of a water heater over a particular time period, and each individual may be configured to store two water heater control solutions, one in the dominant genotype and one in the recessive genotype. In another embodiment, the population may include solutions (e.g., controller set points) for controlling the operation of one or more wind turbines over a particular time period, and each individual may be configured to store two sets of wind turbine control set points, one in each of the dominant and recessive genotypes.

The dominant genotype of each individual may be used in evaluation and implementation of the current control solution, while the recessive genotype of each individual may be used to memorize solutions to previously encountered environments. Each individual in the population of a genetic algorithm with binary bit string definitions may be defined as follows:

$$ind_i = \begin{cases} x = \{x_1, x_2, \ldots, x_n\} \\ y = \{y_1, y_2, \ldots, y_n\} \end{cases} \text{ where } x_j, y_j \in \{0, 1\}$$

The vector x represents the dominant genotype and the vector y represents the recessive genotype of individuals in the population.

Figure 4:
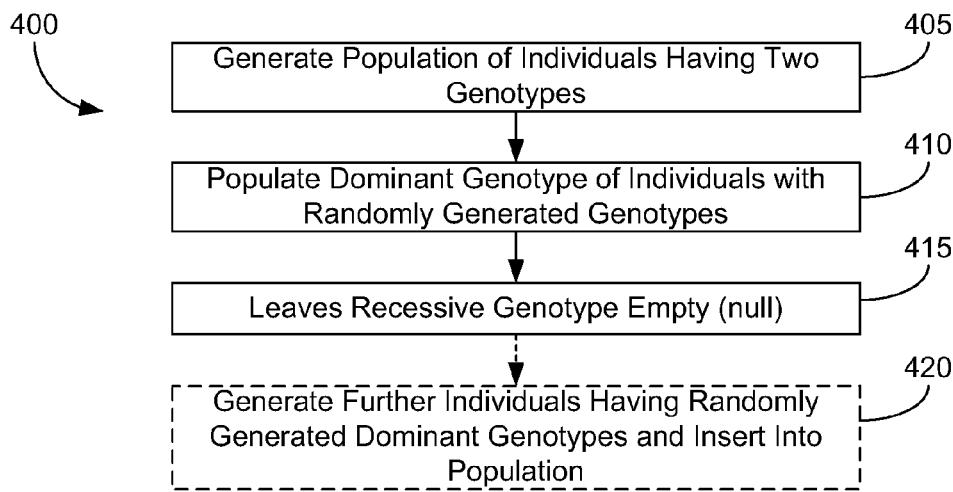
FIG. 4 is a flow diagram of a method of generating a population of individuals for use in controlling a process according to an exemplary embodiment.

Referring now to FIG. 4, a flow diagram of a method 400 including operations that may be performed as part of step 305 of method 300 is shown according to an exemplary embodiment. At step 405, a population of individuals having a diploid, or two genotype, representation is generated. The dominant genotype of each individual is populated with an initial genotype (step 410). In some embodiments, the dominant genotype may be randomly generated for each individual in the population. Utilizing randomly generated dominant genotypes may increase diversity of the achieved solution. The recessive genotype may be set to be empty, or null (step 415).

In some embodiments, explicit diploid evolutionary methods may suffer from a decreasing level of diversity within the population as time proceeds and multiple evolutionary processes (e.g., recombination and mutation) are conducted. The lack of diversity may cause a locally optimal solution to be selected rather than a globally optimal solution due to the lack of exploration of the environment.

In some embodiments, further individuals may be generated and inserted or injected into the population after the initial population has been generated (step 420). As with the individuals initially generated for the population, the additional individuals, or emigrants (e.g., random emigrants), may be assigned a randomly generated dominant genotype and an empty recessive genotype. Injecting new randomly defined individuals into the population may enhance the diversity of the population and/or promote exploration of the environment by the algorithm. One or more new individuals may be injected into the population at predefined times, periodically, based on specified conditions, randomly, etc. In some embodiments, the frequency with which new individuals are generated and/or the number of individuals generated may be based on a defined probability (e.g., a small user-defined probability).

Referring again to FIG. 3, at step 310, the fitness of each individual in the population for the environment being controlled is evaluated. Fitness evaluation may be performed on the dominant genotype of each individual. Fitness evaluation may be performed based on a fitness or optimization function configured to identify the fitness of each individual for the problem being solved or the process, system and/or environment being controlled. In some embodiments, the output of the fitness function may be proportional to the fitness of the individual to which the fitness function is applied for the solution being sought (e.g., such that a higher fitness function output indicates a more fit individual for the solution).

In various different embodiments, fitness functions may be modified and/or customized to particular applications and/or parameters (e.g., water heater control, wind turbine control, etc.). In various water heater-related embodiment, fitness functions may be configured to evaluate the fitness of control solutions based on anticipated demand for hot water (e.g., based on historical flow demand data), anticipated cost (e.g., based on historical, current, and/or anticipated energy cost data obtained from a smart grid), and/or other factors. In various wind turbine-related embodiments, fitness functions may be configured to evaluate the fitness of control solutions based on anticipated power demand, a goal of prolonging the operational life of the wind turbine, anticipated weather conditions, and/or other factors. According to various exemplary embodiments, fitness functions may be directed to a single objective or multiple objectives and may be defined explicitly for a problem or application under consideration.

Parents are selected for evolution based on the results of the fitness evaluation of each individual in the population. Once the parents have been selected, the population is evolved by performing recombination and mutation on the selected parents until a new or updated population has been generated.

Figure 5:
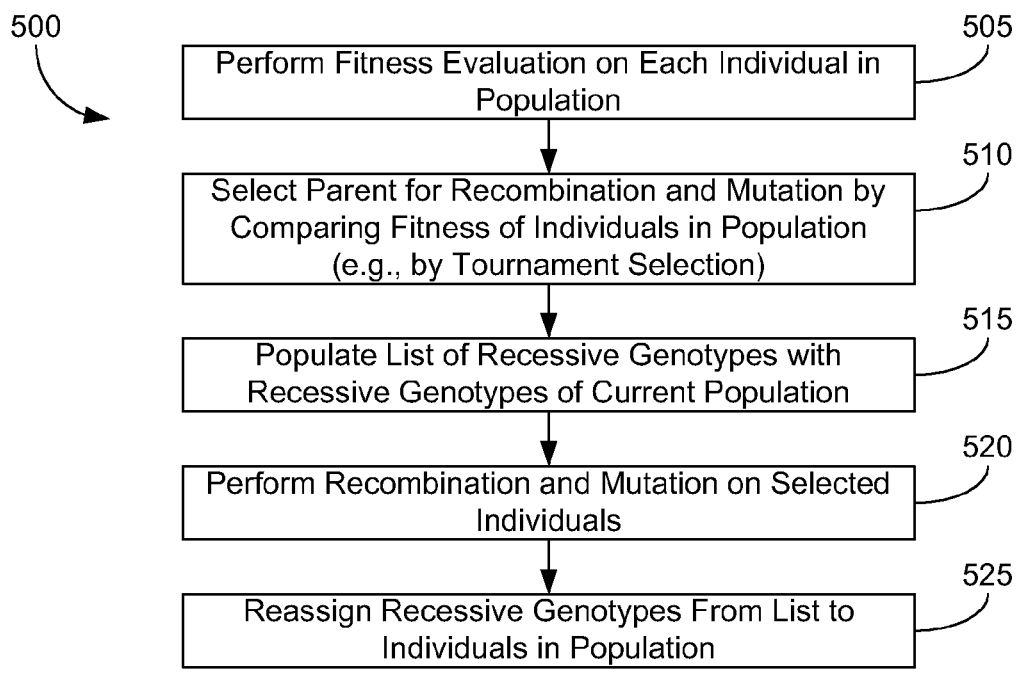
FIG. 5 is a flow diagram of a method of evaluating the fitness of a population of individuals and modifying the population based on the fitness evaluation according to an exemplary embodiment.

Referring now to FIG. 5, a flow diagram of a method 500 including operations that may be performed as part of step 310 of method 300 is shown according to an exemplary embodiment. At step 505, a fitness evaluation is performed on each individual in the population. The fitness evaluation may be performed by applying a fitness or optimization function to the dominant genotype of each individual.

Parents are then selected for recombination and mutation based on the results of the fitness evaluation of each of the individuals (step 510). In some embodiments, parents may be chosen through a tournament selection process. In the tournament selection process, individuals may be arranged in a tournament style such that adjacent pairs of individuals compete head-to-head, or are compared against each other for fitness. The individual with the greater fitness in each comparison proceeds to the next round to face another individual, and this process continues until a "winner" of the tournament, or best individual, is decided. The tournament algorithm may construct a tournament tree reflecting the tournament comparisons. The second-best individual must be among the direct losers to the best individual. These direct losing individuals may be determined by stepping through the first tournament tree and a second tournament may be held between the direct losing individuals to determine a second-best individual. The third best individual must be among the direct losers of the second-best individual in either the first or second tournament trees, and another tournament may be held to determine the third-best individual. This process continues until the desired amount of parent individuals has been obtained. In some embodiments, each parent chosen for recombination and mutation of the n individuals in the population may be provided as follows:

selected$_i$=argmax$_i$f(i)

In the above, f(i) is the fitness of the $i^{th}$ individual in the population as measured against the fitness function. In some embodiments, two individuals will be selected for evolution of the population. In other embodiments, more than two (e.g., four, eight, etc.) will be chosen for recombination and mutation. In some embodiments, selection methods other than tournament selection may be used to select individuals from the population (e.g., roulette wheel, probabilistic weighting, etc.). In various embodiments, any selection methodology that accounts for the fitness of the individuals in relation to the fitness function may be used.

The recessive genotypes of the current population may be saved in a list of recessive genotypes (step 515) and recombination and mutation may be performed on the dominant genotype of the individuals of the population (step 520). Recombination may be performed by crossing over portions (e.g., bits for a bit string population) of the dominant genotype of the selected parents to generate new individuals for the evolved population. In some embodiments, a crossover rate may be provided (e.g., user-defined, predefined, random, etc.) upon which the crossover of parents may be based. The parents and/or new individuals may also be subjected to mutation by flipping (e.g., randomly) the allele of one or more loci of the dominant genotype. For binary bit string individuals, for example, mutation may involve randomly flipping the value of one or more bit string positions in the dominant genotype. The determination of which values to flip may be based upon a probability that is provided as a parameter. The recessive genotypes added to the recessive genotype list may be reassigned to individuals within the newly evolved population (step 525). In some embodiments, the recessive genotypes may be reassigned to individuals within the newly evolved population at random. Storing recessive genotypes at the time of performance of an evolutionary algorithm may be referred to as utilizing explicit memory.

Referring again to FIG. 3, environmental changes may be detected and the current population may be modified based on the best or most fit solution among the recessive genotypes in the population (step 315). A change in the environmental conditions may be detected by monitoring the best fitness of the population (e.g., the fitness of the most fit individual based on the evaluation of the dominant genotype of each individual against the fitness function) for changes. When a substantial change, or a best fitness change above a particular threshold, is detected, the current best solution (e.g., the dominant genotype of the individual having the best fitness) may be saved within the recessive genotype of one of the individuals in the population and the best solution to the new changed environment may be determined from among the recessive genotypes of the current population. The population may be evolved based on the newly determined best saved solution.

Figure 6:
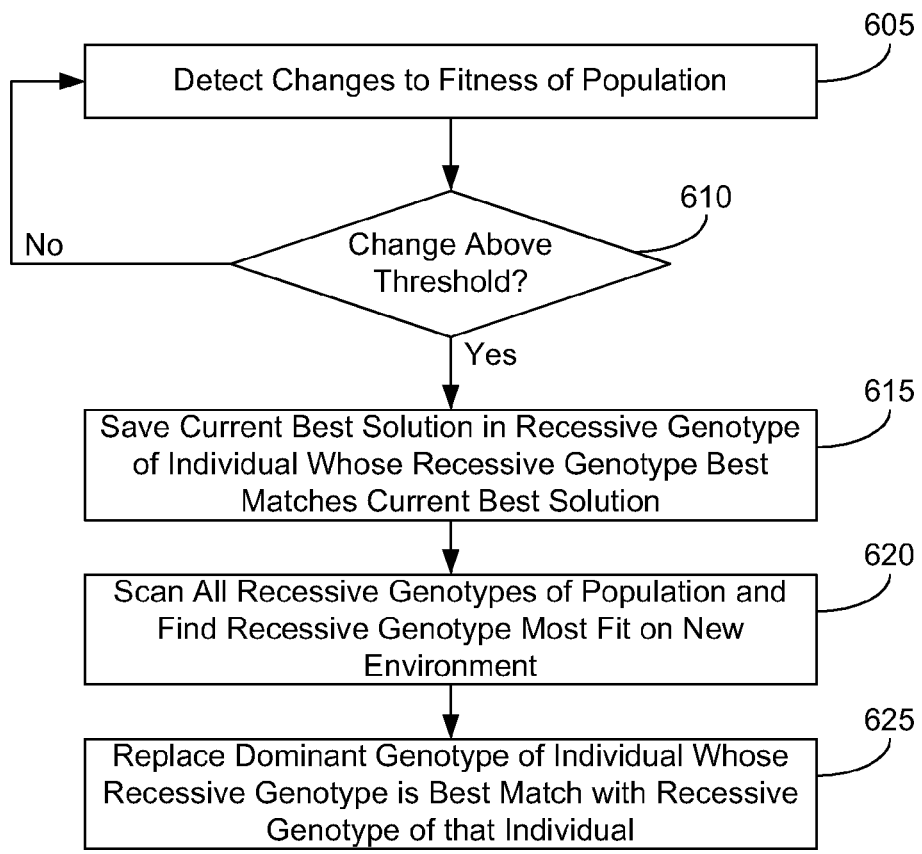
FIG. 6 is a flow diagram of a method of detecting and reacting to an environmental change of a controlled process according to an exemplary embodiment.

Referring now to FIG. 6, a flow diagram of a method 600 including operations that may be performed as part of step 315 of method 300 is shown according to an exemplary embodiment. At step 605, the fitness of the population is monitored (e.g., periodically, continually, after the occurrence of specified events or upon detection of particular input values, etc.) to detect any changes to the environment being monitored and/or controlled. A parameter or threshold c may be provided (e.g., user-supplied, predefined, etc.) and used to determine whether a decrease in the best fitness of the population signifies a significant environmental change such that a new best solution should be determined from a history or memory of previous solutions stored in the recessive genotypes of individuals in the current population. In some embodiments, a substantial change is detected as follows:

$$\text{change} = \begin{cases} \text{true if} & f(t) - f(t-1) > \varepsilon \\ \text{false} & \text{otherwise} \end{cases}$$

In the above, f(t) is the fitness of the best individual in the population at time t and f(t−1) is the fitness of the best individual in the population at a time prior to t. At step 610, it is determined whether a change above the threshold has been detected. If not, the best fitness of the population continues to be monitored (step 605).

The recessive genotypes of each of the individuals of the population operate to store a memory or history of previous environments. Specifically, the recessive genotypes are used to store previously encountered genotypes (e.g., dominant genotypes), such as dominant genotypes of best fit individuals from previous generations of the population.

If a change above the threshold has been detected, the current best solution, or dominant genotype of the individual in the current population having the best fitness, is saved in the recessive genotype of the individual of the population having a recessive genotype that most closely matches the current best solution (step 615). If the detected change is the first above-threshold change detected in the running of the diploid evolutionary algorithm, such that all recessive genotypes are set to empty or null, then all individuals in the population may have their recessive genotypes populated with the dominant genotype of the most fit individual in the previous generation (e.g., the most fit individual at time t−1). If the detected change is not the first change, the recessive genotypes of the current population may be scanned to find the recessive genotype that is most similar to the dominant genotype of the most fit individual in the previous generation. In some embodiments, a metric similar to Hamming similarity may be used for the similarity determination, such as the following:

$$similarity_i = \sum_{j=0}^{N} \begin{cases} 1 & \text{if } ind_{ij} = best_j \\ 0 & \text{otherwise} \end{cases}$$

In the exemplary embodiment shown above, the comparison of the allele (e.g., value) of the $j^{th}$ loci (e.g., bit string position) of the individual under consideration is made to the allele of the $j^{th}$ loci of the best individual of the previous generation. Each of N loci in the individual under consideration are compared to the corresponding N loci of the best individual of the previous generation (i.e., a bit-wise comparison of the genotypes is performed). The similarity measure is determined based on the total number of similar bits found in the comparison. In other embodiments, other similarity measures may be utilized. Ties in similarity may be broken at random or based on parameters provided to the algorithm. Once the individual having the most similar recessive genotype is found, the recessive genotype is set to be the dominant genotype of the best fit individual of the previous generation.

At step 620, the recessive genotypes of each of the individuals in the current population are evaluated for fitness in current environmental conditions by applying the fitness function to the recessive genotypes. Once the recessive genotype of best fitness in the current environment is identified, the individual having the most fit recessive genotype has its dominant genotype replaced with its recessive genotype (step 625). In some embodiments, more than one most fit recessive genotype may be identified (e.g., the top 5, 10, 12, n, etc. most fit recessive genotypes) and the corresponding individuals may have their dominant genotypes replaced with the recessive genotypes. The replacement of dominant genotypes by the recessive genotypes assists in convergence if the current environment is similar to one that was previously encountered.

In some embodiments, mutation (e.g., at step 520 of method 500) may include a hypermutation in which an individual's dominant genotype may assume the value of its recessive genotype. The probability that an individual will undergo such a hypermutation may be provided as a parameter to the evolutionary algorithm. In some embodiments, the probability may be set to be relatively small, such that this form of hypermutation happens infrequently. This form of mutation may help increase the diversity of the current population as well as assist in possible anticipation of environmental changes.

In some embodiments, systems and methods disclosed herein may be used to control the operation of various systems and/or processes (e.g., water heaters, wind turbines, etc.). In other embodiments, systems and methods disclosed herein may be used to monitor and/or model environments (e.g., weather systems) without controlling the systems.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium (e.g., non-transitory medium) which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machine to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method of modeling an environment, comprising:
   generating, using a population generation module, an initial population comprising a plurality of individuals, each individual comprising a dominant genotype and a recessive genotype, wherein the population generation module comprises instructions stored on a non-transitory computer-readable medium that are executable by a processor;
   evaluating, using a fitness evaluation module, the fitness of each of the plurality of individuals by applying a fitness function to the dominant genotype of each individual, wherein the fitness evaluation module comprises instructions stored on the non-transitory computer-readable medium that are executable by the processor;
   modifying, using the fitness evaluation module, the initial population of individuals based on the fitness evaluation; and
   injecting, using the population generation module, one or more additional individuals into the modified population of individuals, wherein each of the additional individuals comprises a randomly generated dominant genotype.

2. The method of claim 1, wherein the additional individuals are injected into the modified population based on a user-defined probability.

3. The method of claim 1, wherein the additional individuals comprise a recessive genotype that is initially set to be empty.

4. The method of claim 1, further comprising storing, using a change detection module, previously encountered genotypes in the recessive genotypes of the individuals, wherein the change detection module comprises instructions stored on the non-transitory computer-readable medium that are executable by the processor.

5. The method of claim 4, further comprising detecting, using the change detection module, a change in the environment by comparing a best fitness of a current generation of the population with a best fitness of a previous generation of the population.

6. The method of claim 5, further comprising:
   saving, using the change detection module, the dominant genotype of an individual having the best fitness of the current generation in a recessive genotype;
   determining, using the change detection module, a recessive genotype that is most fit to the changed environment under the fitness function; and
   replacing, using the change detection module, a dominant genotype with the recessive genotype that is determined to be most fit to the changed environment.

7. The method of claim 1, wherein generating the population comprises populating the dominant genotype of each individual in the population with a randomly generated genotype.

8. A control system, comprising:
   an electronic processor configured to
      generate a population comprising a plurality of individuals, each individual comprising a dominant genotype and a recessive genotype;
      evaluate the fitness of the plurality of individuals, wherein evaluating the fitness of the plurality of individuals comprises applying a fitness function to the dominant genotype of each individual;
      modify the dominant genotype of one or more selected individuals based on the fitness function and generate a modified population based on the modified selected individuals; and
      generate one or more additional individuals for insertion into the modified population, each of the additional individuals comprising a randomly generated dominant genotype.

9. The control system of claim 8, wherein the processor is configured to insert the additional individuals into the modified population based on a user-defined probability.

10. The control system of claim 8, wherein the processor is configured to initially set the recessive genotype of the additional individuals to be empty.

11. The control system of claim 8, wherein the processor is configured to store previously encountered genotypes in the recessive genotypes of the individuals.

12. The control system of claim 8, wherein the processor is configured to detect a change in the environment by comparing a best fitness of a current generation of the population with a best fitness of a previous generation of the population.

13. The control system of claim 8, wherein the processor is configured to save the dominant genotype of an individual having the best fitness of the current generation in a recessive genotype, determine a recessive genotype that is most fit to the changed environment under the fitness function, and replace a dominant genotype with the recessive genotype that is determined to be most fit to the changed environment.

14. The control system of claim 8, wherein the processor is configured to populate the dominant genotype of each individual in the population with a randomly generated genotype.

15. A non-transitory computer-readable medium having instructions stored thereon, the instructions being executable by a processor to execute a method, the method comprising:

generating a population comprising a plurality of individuals, each individual comprising a dominant genotype and a recessive genotype, wherein the fitness of population of individuals for a modeled environment is evaluated and the population is modified based on results of the fitness evaluation; and generating at least one additional individual and injecting the individual into the population after the population has been modified, wherein the at least one additional individual is initially assigned a randomly generated dominant genotype.

16. The non-transitory computer-readable medium of claim 15, wherein the additional individuals are injected into the modified population based on a user-defined probability.

17. The non-transitory computer-readable medium of claim 15, wherein the additional individuals comprise a recessive genotype that is initially set to be empty.

18. The non-transitory computer-readable medium of claim 15, wherein the method further comprises detecting a change in the environment by comparing a best fitness of a current generation of the population with a best fitness of a previous generation of the population.

19. The non-transitory computer-readable medium of claim 15, wherein the method further comprises:

saving the dominant genotype of an individual having the best fitness of the current generation in a recessive genotype;

determining a recessive genotype that is most fit to the changed environment under the fitness function; and replacing a dominant genotype with the recessive genotype that is determined to be most fit to the changed environment.

20. The non-transitory computer-readable medium of claim 15, wherein generating the population comprises populating the dominant genotype of each individual in the population with a randomly generated genotype.

\* \* \* \* \*